Patented Oct. 15, 1940

2,218,373

UNITED STATES PATENT OFFICE 2,218,373

PROCESS OF MAKING LAMINATED ARTICLES

George Alexander, Pittsfield, Mass., assignor to General Electric Company, a corporation of New York No Drawing. Application August 7, 1936, Serial No. 94,800

2 Claims. (Cl. 154—2)

The present invention relates to the production of laminated articles. More particularly, it relates to the manufacture of composite structures built up from layers of fibrous materials, such as paper, cloth and the like, impregnated with an aqueous solution of potentially reactive phenolic resin, and united under heat and pressure to form a hard, dense product. The invention is especially concerned with, and has as a main object to provide firmly bound laminae of material of the general kind stated that is essentially free from substances having an objectionable odor or capable of imparting an objectionable odor or taste to food products.

For a consideration of what I believe to be novel and my invention, attention is directed to the following specification and the claims appended thereto.

Laminated articles made with phenolic resins, as heretofore known, contain a small amount of unreacted ingredients of the resin. These ingredients impart an unpleasant odor to the material and make it unsuited for application where odors of any kind are absolutely undesirable such, for instance, as in domestic and commercial refrigerators. Because of its heat-insulating properties and its mechanical strength, a phenolic laminated material was early recognized as a material unusually well suited for use in constructing refrigerator cabinets. However, the objectionable odor common to such products as heretofore known held in check their wide application in the refrigeration field.

The characteristic odor of the old materials was due to unreacted ingredients including phenols, incompletely reacted substances, and to ammonium hydroxide, organic amines and other ammoniacal substances used as a catalyst in making the phenolic resin. In order to reduce the odor of the finished product to a minimum one means of accomplishing this result prior to the present invention has been to subject the laminated material to a time-consuming and comparatively expensive process of heating, varnishing and re-heating. The application of a varnish coating tended to seal in the odor, not to remove it. Such treatment was expensive and the products obtained were not practically satisfactory. For example, the process resulted in blistering of many of the pieces which made them unsuited for use.

I have found in order to produce an odorless molded article of the type with which this invention is concerned that it is necessary to use first a catalyst for the reaction between a phenol and an aldehyde which will not impart any odor to the product and second to remove the other odor imparting unreacted ingredients formed in the reaction in an improved and highly effective manner. More particularly, I have found to be advantageous a catalyst comprising an inorganic alkaline substance such as hydroxides, carbonates and bicarbonates of the alkali metals, and hydroxides, bicarbonates and water-soluble carbonates of the alkaline earths, for example, sodium and potassium hydroxides and carbonates, magnesium bicarbonate, and the like. I have further found that the unreacted ingredients including phenols and the like may be removed substantially completely by using a water solution of the resin as an impregnating and binding medium for the laminae instead of the usual alcohol varnish.

In order to illustrate my invention so that it may be carried out by those skilled in the art to which it pertains, I shall describe it in more detail and with particular reference to the following specific example:

| | Parts by weight | Moles |
|---|---|---|
| Phenol (technical grade) | 100 | About 1 |
| Formaldehyde (aqueous, about 37.5 per cent formaldehyde by weight) | 120 | 1.5 |
| Sodium carbonate | 1 | |

The phenol is charged into a steam-jacketed reaction vessel, agitation started, and the aqueous formaldehyde added thereto. The sodium carbonate dissolved in, for instance, about 2 parts by weight of water, is then added to the reaction kettle while continuing the mixing. The contents of the vessel are indirectly heated by turning steam into the jacket of the kettle until the contents reach a temperature of about 60° to 65° C., after which the steam is turned off and the reaction allowed to proceed further under reflux for about 30 minutes, which is a period insufficient to cause separation of resinous composition and water, during which time a temperature as high as about 94° to 98° C. may be reached. At the end of this period of time the reacted mixture is cooled down to a suitable temperature, for example, about 50° to 60° C., by passing cooling water through the jacket of the kettle. The resultant product is a clear, homogeneous aqueous solution of resin containing about 50 to 56 per cent of curing resin. If desired, this aqueous solution may then be dyed. It may be used immediately or it may be stored for three or four months without separation of resin or otherwise made unsuited for use.

In place of phenol other phenolic compounds may be used, for example, substituted phenols such as para-phenyl-phenol, para-tertiary-butyl phenol, para-tertiary-amyl phenol, and the like. Mixtures of phenolic bodies, such as mixtures of phenols and cresols may be used, but care must be exercised in the proportions employed to prevent separation of the phenolic bodies in the aqueous medium. The term "a phenol" as used herein and in the claims which follow therefore includes all such phenolic compounds capable of forming a resinous condensation product with aqueous aldehydes.

Instead of aqueous formaldehyde, aqueous solutions of other aldehydes may be used such, for instance, as aqueous solutions of furfural and acetaldehyde. In all cases the mole ratio of the aldehyde to the phenol is in excess of 1 mole aldehyde to 1 mole phenol; for example, the aldehyde may be only slightly in excess, such as 1.05 to 1.00, or the aldehyde may be very substantially in excess, for instance, about 1.7 to 1.0. In the above illustrative example it will be noted that the mole ratio of aldehyde, specifically formaldehyde, to phenol is about 1.5 moles of the aldehyde to 1 mole of the phenolic body.

For reasons now unknown to me, I have found sodium carbonate to be particularly effective in producing an aqueous liquid coating composition in accordance with this invention. Advantageously, I use the monohydrate form of sodium carbonate, that is, $Na_2CO_3.H_2O$. The amount of non-odor-forming, water-soluble, inorganic alkaline catalyst used in carrying my invention into effect may be varied over wide limits. In general, the less the amount of catalyst, the longer the reaction time. No advantage exists in using an excessive quantity of catalyst.

The clear, homogeneous, aqueous solution of phenolic resin is pumped into a trough of impregnating apparatus, and a continuous sheet of fibrous material such as paper passed therethrough. The impregnated paper is conducted through a drying oven maintained at a temperature above the normal boiling point of water (100° C.) and below the charring temperature of the fibrous material, advantageously at about 120° to 150° C. As a practical matter, however, the temperature employed must be related to the speed at which the coated fibrous material travels through the drying oven in order to obtain an economic and useful material. In the oven a blast of preheated air meets the incoming wet, coated paper and quickly removes water therefrom. The small amount of unreacted phenol and other odorous volatile matter is carried away from the resinous composition deposited in and on the paper, and from the oven, by the water vapor, the volume of which is many times that of the unreacted odorous constituents.

If desired, the heat treatment to remove water and odorous constituents may be conducted under vacuum, thereby making possible use of lower temperatures.

The dried sheets are piled together to form a laminated mass of any desired thickness and then pressed in a hot hydraulic press at a temperature of, for example, about 140° to 160° C., and under a pressure of, for instance, about 1000 to 1500 pounds per square inch, for a period of time sufficient to cure the resin and produce a hard, infusible laminated product which is insoluble in all ordinary solvents.

The laminated sheets are cut to the preferred shape and used for such purposes as may be desired, for example, in the manufacture of cabinets of domestic and commercial refrigerators, cafeteria trays, containers for food or drink, or other articles of commerce utilizing phenolic resinous compositions and wherein odorous constituents are objectionable.

The laminated article is tested for odor in the following manner: A sample strip of the material is liberally moistened with water and, together with a sample of test butter, is placed in a clean test tube and refrigerated for 24 hours at a temperature of about 40° to 45° F. At the end of 24 hours the material must not impart any foreign taste to the butter. The material must also be free from objectionable odors at the end of the test period.

An article produced in accordance with this invention passes the above-described test for odor; that is, it imparts no foreign taste to fresh, unsalted, sweet creamery butter after such butter has been exposed in a closed chamber for 24 hours at a temperature of about 40° to 45° F. in close proximity to any odor derived from the laminated article being tested, and is itself free from objectionable odors at the end of the test period.

In addition to having the characteristic property of showing essentially no odor when tested in the manner described, laminated articles produced by this invention, for instance, refrigerator insulating strips about ⅛ inch thick, are further characterized by properties that result in their passing satisfactorily humidity and grease resistance tests.

In a humidity test, at the end of 30 days at a temperature of about 100° to 110° F. and at 100 per cent relative humidity, the strips are essentially free from surface blisters, swelling (or delamination), checking, fungi growth, and buckling between screws that fasten the strips to a base member.

In a grease-resistance test the greases most commonly stored in a refrigerator, namely, bacon, butter and mayonnaise, are smeared on an insulating strip, each covering an area of about six square inches. The material is unattacked by these greases and shows no tendency to become gummy.

What I claim as new and desire to secure by Letters Patent of the United States is:

1. A process of making a hard, dense, laminated article composed of fibrous laminae firmly bound together with a phenol-formaldehyde condensation product, said laminated article having the characteristic property of being essentially free from odors that are absorbed by, and impart a foreign taste to fresh, unsalted, sweet creamery butter after such butter has been exposed in a closed chamber for 24 hours at a temperature of about 40° to 45° F. in close proximity to said laminated article, and said process comprising coating and impregnating a layer of fibrous material in sheet form by passing it through a clear, homogeneous aqueous liquid coating composition consisting of an aqueous solution of resinous composition formed by reacting phenol and an aqueous solution of formaldehyde in the ratio of one mole of phenol to more than one mole but not substantially in excess of 1.7 moles of formaldehyde with inorganic alkaline catalyst and for a time such that substantially no separation of resinous composition and water results, simultaneously removing water and odorous volatile constituents from the said coated and impregnated material by conducting the same through an oven maintained at a temperature of about 120° to 150° C. and by applying a blast of preheated air to the incoming wet material, the vaporized water acting as a carrier for the odorous constituents, superposing the dried and impregnated sheets, and subjecting the superposed sheets to heat and pressure to bond the surfaces together.

2. A process of making a hard, dense, laminated article especially adapted for fabrication into a refrigerator insulating strip, said article being composed of fibrous laminae firmly bound together with a phenol-formaldehyde condensation product and having the characteristic property of being essentially free from odors that are absorbed by, and impart a foreign taste to fresh, unsalted, sweet, creamery butter after such butter has been exposed in a closed chamber for 24 hours at a temperature of about 40° to 45° F. in close proximity to said laminated article, and said process comprising coating and impregnating a layer of fibrous material in sheet form by passing it through a clear, homogeneous, liquid coating composition consisting of an aqueous solution of resinous composition formed by reacting phenol and an aqueous solution of formaldehyde in the ratio of one mole of phenol to 1.5 to 1.7 moles of formaldehyde with sodium carbonate catalyst and for a time such that substantially no separation of resinous compositions and water result, simultaneously removing water and odorous volatile constituents from the said coated and impregnated material by conducting the same through an oven maintained at a temperature of about 120° to 150° C. and by applying a blast of preheated air to the incoming wet material, the vaporized water acting as a carrier for the odorous constituents, superposing the dried and impregnated sheets, and subjecting the superposed sheets to heat and pressure to bond the surfaces together.

GEORGE ALEXANDER.